(12) United States Patent
Sargis

(10) Patent No.: US 8,529,180 B1
(45) Date of Patent: Sep. 10, 2013

(54) SUPER SPIKE

(71) Applicant: United Steel and Fasteners, Itasca, IL (US)

(72) Inventor: Isaac Sargis, South Ponte Verda Beach, FL (US)

(73) Assignee: United Steel and Fasteners, Itasca, IL (US)

( * ) Notice: Subject to any disclaimer, the term of this patent is extended or adjusted under 35 U.S.C. 154(b) by 0 days.

(21) Appl. No.: 13/741,841

(22) Filed: Jan. 15, 2013

Related U.S. Application Data

(60) Provisional application No. 61/699,033, filed on Sep. 10, 2012.

(51) Int. Cl.
*F16B 15/00* (2006.01)

(52) U.S. Cl.
USPC .................................. 411/453; 411/451.1

(58) Field of Classification Search
USPC ................... 411/450, 451.1; 238/366, 372
See application file for complete search history.

(56) References Cited

U.S. PATENT DOCUMENTS

| | | | | |
|---|---|---|---|---|
| 262,404 A * | 8/1882 | Gray | | 238/294 |
| 364,301 A | 6/1887 | Rogers | | |
| 364,439 A | 6/1887 | Rogers | | |
| 368,687 A | 8/1887 | Rogers | | |
| 426,008 A | 4/1890 | Groff | | |
| 546,269 A | 9/1895 | Coutant | | |
| 551,354 A | 12/1895 | Lee | | |
| 911,273 A | 2/1909 | Scott | | |
| 949,570 A | 2/1910 | Harris | | |
| 994,330 A | 6/1911 | Morris | | |
| 1,092,683 A | 4/1914 | Wickham | | |
| 1,118,832 A | 11/1914 | Wolhaupter | | |
| 1,229,560 A | 6/1917 | Whiteman | | |
| 1,885,028 A | 10/1932 | Arenz | | |
| 1,897,335 A | 2/1933 | Riedel et al. | | |
| 1,912,222 A | 5/1933 | Rosenberg | | |
| 1,927,389 A | 9/1933 | Castner | | |
| 2,024,071 A | 12/1935 | Taylor et al. | | |
| 2,056,309 A * | 10/1936 | Osenberg | | 411/453 |
| 2,168,854 A | 8/1939 | Agnew | | |
| 2,169,408 A * | 8/1939 | De Vellier | | 411/412 |
| 2,352,487 A | 6/1944 | McNamara, Jr. | | |
| 2,601,385 A | 6/1952 | Graham | | |
| 2,663,662 A | 12/1953 | Graf et al. | | |
| 3,025,003 A * | 3/1962 | Fortune | | 238/372 |
| 3,330,177 A * | 7/1967 | Oliver | | 411/424 |
| 3,731,961 A | 5/1973 | Becker | | |
| 3,782,056 A | 1/1974 | Osteen | | |

(Continued)

*Primary Examiner* — Gary Estremsky
(74) *Attorney, Agent, or Firm* — Brinks Hofer Gilson & Lione

(57) ABSTRACT

A fastener is provided. The fastener includes an elongated shank extending along a longitudinal axis. The shank has a first end and a second end and a head portion is formed at the first end of the shank. The head portion includes an annular flange extending radially out from the longitudinal axis and has a first diameter. The fastener also includes a first section extending along at least a portion of the shank and disposed adjacent to the head portion. The fastener also includes a knurled section extending along at least a portion of the shank and disposed adjacent to the first cylindrical section where the knurled section includes a plurality of longitudinally extending grooves and peaks disposed around a circumference of the shank and a helical thread portion extending axially along at least a portion of said shank and disposed adjacent to the knurled section.

19 Claims, 3 Drawing Sheets

(56) References Cited

U.S. PATENT DOCUMENTS

| | | | | |
|---|---|---|---|---|
| 3,987,698 | A | 10/1976 | Rabe | |
| 4,718,802 | A | 1/1988 | Rockenfeller et al. | |
| 4,808,051 | A | 2/1989 | Gietl | |
| 4,941,337 | A | 7/1990 | Emery | |
| 5,375,957 | A | 12/1994 | Golledge | |
| 5,429,300 | A | 7/1995 | Berna | |
| 5,516,248 | A * | 5/1996 | DeHaitre | 411/387.2 |
| 5,642,974 | A | 7/1997 | Gabriel et al. | |
| 5,810,534 | A | 9/1998 | Carlisle et al. | |
| 6,109,850 | A | 8/2000 | Commins | |
| 6,185,896 | B1 | 2/2001 | Roberts et al. | |
| 6,471,140 | B2 * | 10/2002 | Barry et al. | 238/372 |
| 6,808,120 | B2 * | 10/2004 | Oram et al. | 238/372 |
| 7,029,217 | B2 | 4/2006 | Kawatani et al. | |
| 7,207,761 | B2 | 4/2007 | Dill et al. | |
| 7,682,116 | B2 * | 3/2010 | Cabrele et al. | 411/80.5 |
| 2004/0047713 | A1 | 3/2004 | Jung | |
| 2005/0017086 | A1 | 1/2005 | Barry | |
| 2005/0269421 | A1 | 12/2005 | Sargis | |
| 2006/0018733 | A1 | 1/2006 | Dill et al. | |

* cited by examiner

SUPER SPIKE

RELATED APPLICATIONS

This application claims the benefit of U.S. Provisional Application No. 61/699,033, filed Sep. 10, 2012, which is incorporated by reference herein in its entirety

FIELD OF THE INVENTION

The present invention relates to fasteners. In particular, the present invention relates to a drive spike for driving into a substrate and preventing inadvertent removal of the drive spike from the substrate.

BACKGROUND

Many types of fasteners are known in the art for firmly holding a variety of components together. For example, railroad drive spikes are used to hold steel rails to wooden ties. Drive spikes may also be used to hold together bridges, trestles, wooden piers, and docks.

Typically, for railways, the steel rails have mounting flanges adapted to mate with metallic plates. The metallic plates also contact the wooden ties and are adapted receive drive spikes to secure the rails to the ties. The spikes are inserted through openings or recesses in the metal plate and driven into the wooden ties. Thus, the steel rails are secured to the wooden ties via the metal plates and the drive spikes.

In use, the drive spikes eventually loosen from the wooden ties as a result of events such as repeated train crossings and environmental conditions. The weight and vibrations from the passing trains cause the spikes to loosen and enlarge the entry holes within the wooden ties. Environmental conditions such as humidity, temperature changes, rain, snow, etc. may also cause the drive spikes to become loosed within the wooden ties. Additionally, vandals may purposely loosen or remove the drive spikes. As the drive spikes become loose, the holes into which the drive spikes are inserted in the wooden ties enlarge. The enlarged holes then become further exposed to environmental conditions, causing the wood to decay more quickly.

Tightening or replacement of the drive spikes is often difficult and costly. Removal of a drive spike may cause further destruction to the wooden tie making the replacement of the drive spike nearly impossible. Once the drive spike is loosened and or the wood becomes damaged, the entire wooden tie often requires replacement in order to provide a steel rail that is securely fastened to the wooden tie.

Similar to the railway example, the bridge, trestle, pier and dock drive spike connections are also subject to vibrational and environmental stresses, as well as vandalism, that cause unwanted loosening of the drive spikes within the substrate. Once the drive spike loosens, the substrate into which the spike is driven usually must be replaced in order to securely fasten the bridge, trestle, etc. to the substrate. Replacement of the drive spike itself is generally insufficient to securely fasten objects to the substrate. The enlarged hole in the substrate causes the substrate to become more quickly degraded and thus prevents the drive spike from securely gripping the substrate.

Therefore, it is an object of the present invention to provide a drive spike that securely fastens an object to a substrate, such as wood, and prevents inadvertent loosening or removal of the drive spike from the substrate, thus further reducing the requirement for replacement of the substrate due to damage caused by the insecure fastening of an object to a substrate.

BRIEF SUMMARY

In order to alleviate one or more shortcomings of the prior art, a drive spike is provided herein.

A fastener is provided. The fastener includes an elongated shank extending along a longitudinal axis. The shank has a first end and a second end and a head portion is formed at the first end of the shank. The head portion includes an annular flange extending radially out from the longitudinal axis and has a first diameter. The fastener also includes a first section extending along at least a portion of the shank and disposed adjacent to the head portion. The fastener also includes a knurled section extending along at least a portion of the shank and disposed adjacent to the first cylindrical section where the knurled section includes a plurality of longitudinally extending grooves and peaks disposed around a circumference of the shank and a helical thread portion extending axially along at least a portion of said shank and disposed adjacent to the knurled section.

Advantages of the present invention will become more apparent to those skilled in the art from the following description of the preferred embodiments of the invention which have been shown and described by way of illustration. As will be realized, the invention is capable of other and different embodiments, and its details are capable of modification in various respects. Accordingly, the drawings and description are to be regarded as illustrative in nature and not as restrictive.

DETAILED DESCRIPTION

Figure 1:
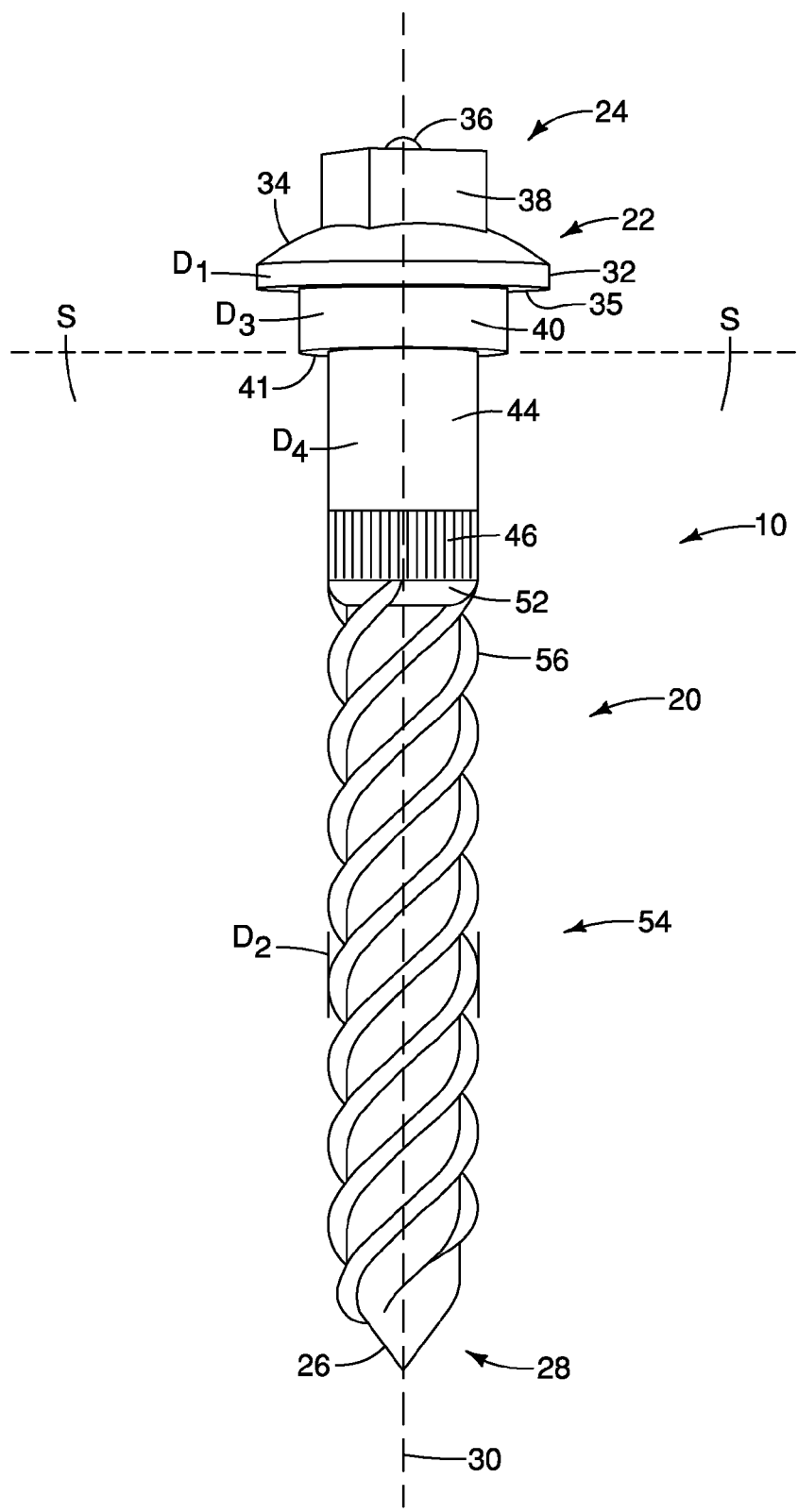
FIG. 1 is a side elevational view of an embodiment of a fastener in accordance with the present invention.

An embodiment of the present invention is shown in FIG. 1 as a fastener in the form of a drive spike 10. The lengths and diameters of the fastener 10 described herein are meant to be non-limiting examples and may be varied as will be understood by one of skill in the art.

The fastener 10 includes an elongated shank 20, a head 22 at a first end portion 24 of the shank 20 and a tip 26 at a second end portion 28 of the shank 20. The tip 26 may be any shape, including blunt and pointed. The fastener 10 has a longitudinal axis 30 extending from the first end portion 24 to the second end portion 28.

The head 22 further comprises an annular flange 32 that extends radially from the shank 20. The annular flange 32 may include a dome-shaped upper surface 34 and a flattened lower surface 35 that extends radially beyond the shank 20. The head 22 may further comprise a protrusion 36 that extends from the first end portion 24 of the shank 20. The protrusion 36 may be hemispherical in shape and adapted to be engaged by a striking tool to drive the fastener 10 into a substrate S. The protrusion 36 is adapted to receive significant force and is further adapted to deform as a result of the striking force.

Figure 3:
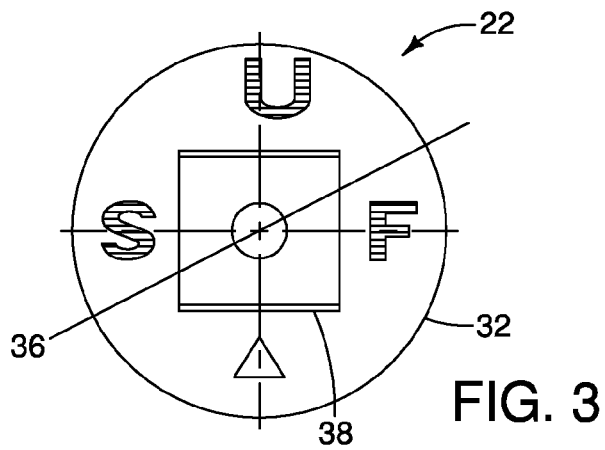
FIG. 3 a top plan view of FIG. 1.

The head 22 also comprises an outer surface 38 adapted to be engaged by a gripping tool such as a wrench or a socket that may be used to apply torque to the fastener 10 to drive the fastener 10 into the substrate S. In some embodiments, the outer surface 38 may be polygonally shaped. However, the outer surface 38 may be any shape that may be used with a variety of tools. Alternatively, the outer surface 38 does not need to be engaged to drive the fastener 10 into the substrate S. For example, a hole may be pre-drilled in the substrate S and the fastener 10 may be driven into the substrate S using a striking tool to strike the protrusion 36 of the head 22 and thereby insert the fastener 10 into the substrate S. As described below, additional features of the fastener 10 facilitate insertion of the fastener 10 into the substrate using a driving force. A top view of an embodiment of the head 22 of the fastener 10 is shown in FIG. 3. By way of non-limiting example, the head 22 may have a square cross sectional shape having sides extending radially outwardly from the longitudinal axis. Each side may extend about 0.75 to about 0.81 inches in some embodiments.

Figure 2:
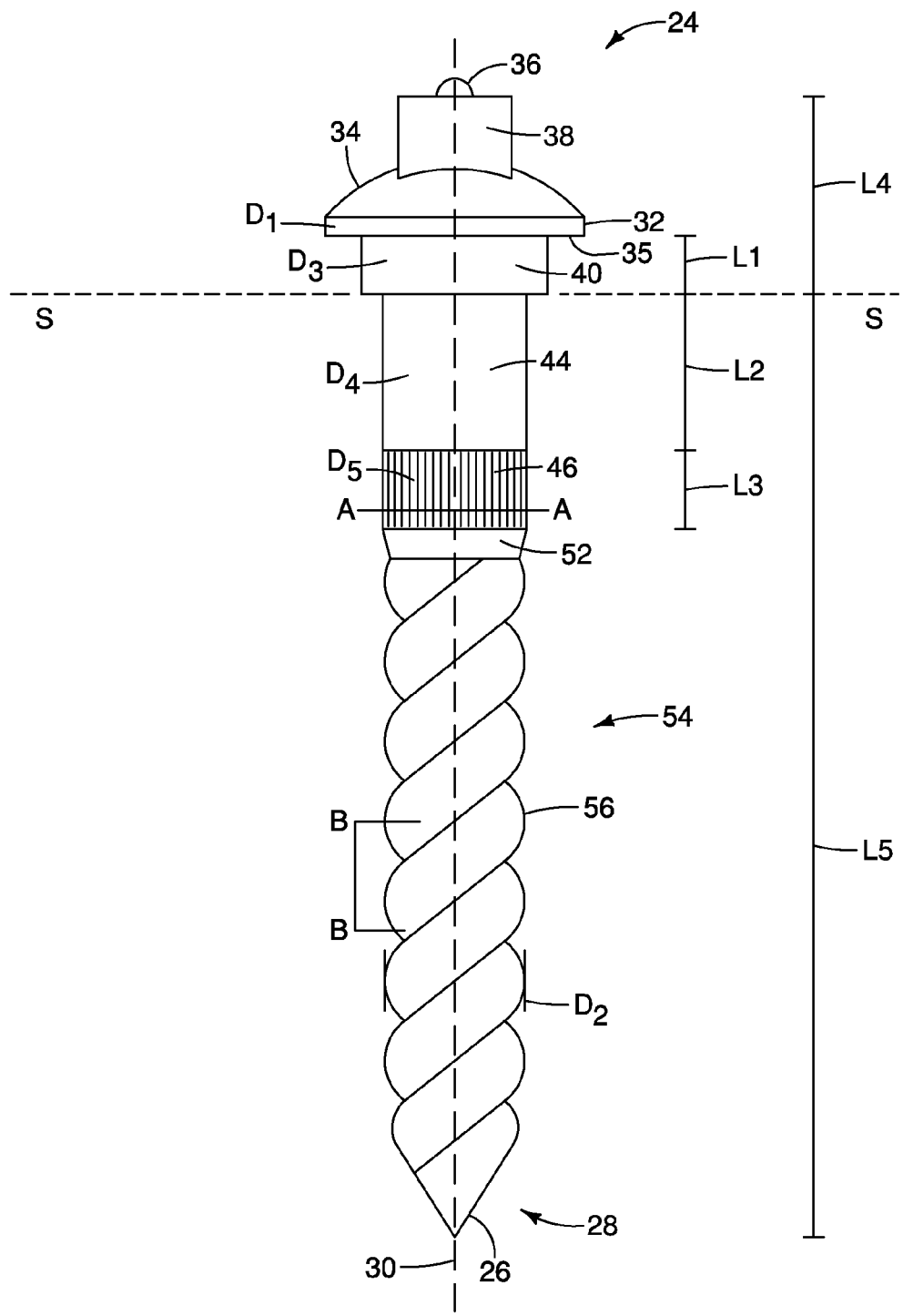
FIG. 2 is a side elevational view of an embodiment of a fastener in accordance with the present invention.

As shown in FIGS. 1 and 2, the annular flange 32 extends radially from the longitudinal axis 30 of the fastener 10. In some embodiments, the annular flange 32 extends beyond the circumference of the shank 20. As shown in FIGS. 1 and 2, the annular flange 32 has a diameter $D_1$ that is greater than a diameter $D_2$ of a threaded portion of the shank 20 (described below). In some embodiments, the fastener 10 further includes a first section 40 adjacent to the flange 32. The first section 40 may be cylindrically shaped and have a smooth surface. The first section 40 may also be polygonally shaped or may include one or more flattened sides. In some embodiments, the first section 40 is positioned directly adjacent to the flange 32. The first section 40 includes an abutment surface 41 positioned apart from the flange 32. The abutment surface 41 is configured to abut the substrate S into which the fastener 10 is driven so that the first portion 40 is positioned above the substrate S when the fastener 10 has been driven into the substrate S. The first section 40 has a diameter $D_3$ that is less than the diameter $D_1$ of the annular flange 32 and greater than the diameter $D_2$ of the shaft. By way of non-limiting example, the diameter $D_1$ may be about 1.75 inches, the diameter of $D_2$ may be about 0.937 inches (5/16) and the diameter of $D_3$ may be about 1.25 inches. The first section 40 may be sized and shaped to receive a tool (not shown) to remove the fastener 10 from the substrate S. The smaller diameter $D_3$ of the first section 40 relative the diameter $D_1$ of the annular flange 32 allows the tool to contact the lower surface 35 of the annular flange 32 that is positioned above the substrate S so that the tool can pull the fastener 10 out of the substrate S. A length $L_1$ of the first section 40 may be provided so that the tool fits between the substrate S and the lower surface 35 of the annular flange 32. By way of non-limiting example, the length $L_1$ may be about 0.375 inches.

As shown in FIGS. 1 and 2, the fastener 10 may also include a second section 44 adjacent to the first section 40 so that the first section 40 is between the flange 32 and the second section 44. The second section 44 may be cylindrically shaped and have a smooth surface. The second section 44 may also be polygonally shaped or may include one or more flattened sides. In some embodiments, the second section 44 is positioned directly adjacent to the first section 40. The second section 44 has a diameter $D_4$ that is less than the diameters $D_1$ and $D_3$. In some embodiments, the diameter $D_4$ is substantially the same as the diameter $D_2$ of the shank 20. By way of non-limiting example, the diameter $D_4$ may be about 0.937 inches. The second section 44 is configured to be positioned within the substrate S. A length $L_2$ of the second section 44 may be about 1.125 inches.

Figure 4:
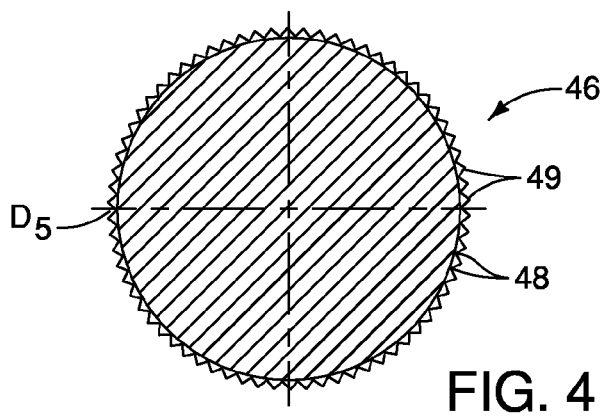
FIG. 4 is a sectional view through line A-A of FIG. 2.

The shank 20 may also include a knurled section 46 adjacent to the second section 44. The knurled section 46 may be cylindrically shaped and may include a plurality of axial grooves 48 and peaks 49 as shown in the cross sectional view in FIG. 4. In some embodiments, the peaks 49 may include a leading edge. In some embodiments, the knurled section 46 is directly adjacent to the second cylindrical section 44. The knurled section 46 is configured to allow the fastener 10 to be driven into the substrate S and to resist removal for the fastener 10 from the substrate S. The knurled section 46 has a diameter $D_5$ measured at the peaks 49 that is slightly larger than the diameters $D_2$ and $D_4$ and less than the diameter $D_3$. By way of non-limiting example, the diameter $D_5$ may be about 0.969 inches and a length $L_3$ of the knurled section may be about 0.5 inches. For the knurled section 46 having a diameter D5 of about 0.969 inches, the number of peaks 49 is greater than 40. The peaks 49 may all be equal in size and shape extending around the shank 20. In some embodiments, the depth of the grooves 48 may be about 0.025 inches to about 0.035 inches. In some embodiments, the peaks 49 extend substantially parallel to the longitudinal axis of the shank 20.

The shank 20 also includes a transition section 52 extending between the knurled section 46 and a threaded section 54. The transition section 52 tapers inward from the knurled section 46 to the threaded section 54 so that threads 56 can be rolled on the threaded section 54. The transition section may be less than about 0.1 inch.

Figure 5:
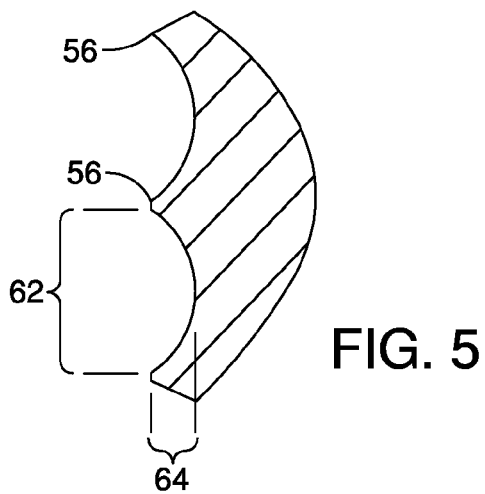
FIG. 5 is a sectional view through line B-B of FIG. 2.

The shank 20 also includes the threaded section 54 that includes one or more threads 56. In some embodiments the threads 56 may be helical fluted threads as shown in FIG. 1. The threads 56 extend from the transition section 52 to about the tip 26 of the shank 20. The angle at the end of the threads 56 may be about 40° to about 50°, more preferably about 45°. In some embodiments, the threaded section 54 may include 4 fluted threads 56. As shown in FIG. 5, in some embodiments, a width 62 of each helical turn of the thread 56 is about 0.5 inches, although any width may be used. In some embodiments, a depth 64 of the thread 56 protruding from the shank 20 is about 0.125 inches, although any depth may be used with the present invention.

In some embodiments, a length $L_4$ of the head 22 and the first section 40 and the protrusion 36 is about 1.375 inches. The protrusion 36 extends about 0.125 inches above the head 22. The length L4 represents the length that is positioned above the substrate S. A length $L_5$ of the shank 20 from the second section to the tip 26 is about 6.5 inches. The length $L_5$ represents the length of the fastener 10 that is inserted into the substrate S. In some embodiments, the length of the fastener 10 may be about 7.75 inches and the knurled section 46 maybe about 1/15 of the length. In some embodiments, the knurled section 46 may be spaced about 1.125 inches from the first section 40. Other lengths and diameters for each of the dimensions described herein may be used and remain within the scope of the invention.

In some embodiments, the fastener of the present invention comprises a metal, more preferably iron or steel, most preferably carbon steel, for example C1035. Any material suitable for forming and having sufficient strength for the fastener of the present invention may be used as will be understood by one of skill in the art.

Although the invention herein has been described in connection with a preferred embodiment thereof, it will be appreciated by those skilled in the art that additions, modifications, substitutions, and deletions not specifically described may be made without departing from the spirit and scope of the invention as defined in the appended claims. It is therefore intended that the foregoing detailed description be regarded as illustrative rather than limiting, and that it be understood that it is the following claims, including all equivalents, that are intended to define the spirit and scope of this invention.

The invention claimed is:

1. A fastener comprising:
an elongated shank extending along a longitudinal axis, the shank comprising a first end and a second end;
a head portion formed at the first end of the shank, the head portion comprising an annular flange extending radially out from the longitudinal axis, the annular flange having a first diameter;
a first section extending along at least a portion of the shank and disposed adjacent to the head portion, the first section having a second diameter, the first diameter being greater than the second diameter;
a knurled section extending along at least a portion of the shank and disposed adjacent to the first cylindrical section, the knurled section comprising a plurality of longitudinally extending grooves and peaks disposed around a circumference of the shank;
a helical thread portion extending axially along at least a portion of said shank and disposed adjacent to the knurled section; and a second section disposed between the first section and the knurled section, the second section having a third diameter that is less than the second diameter.

2. The fastener of claim 1, wherein the first section or the second section or the first and second section are cylindrically shaped.

3. The fastener of claim 1, wherein the knurled section has a fourth diameter, the fourth diameter being greater than the third diameter.

4. The fastener of claim 1, wherein the grooves extend parallel to the longitudinal axis of the shank.

5. The fastener of claim 1, wherein the knurled section comprises greater than 40 grooves.

6. The fastener of claim 1, wherein the head portion comprises a polygonally shaped outer surface positioned above the annular flange.

7. The fastener of claim 1, further comprising a protrusion extending axially from the head portion.

8. The fastener of claim 1, wherein the fastener comprises metal.

9. The fastener of claim 1, wherein the second end is pointed.

10. The fastener of claim 1, further comprising a transition section disposed adjacent to the helical thread portion, the transition section comprising an inward taper toward the thread portion.

11. The fastener of claim 1, wherein said helical thread portion further comprises a plurality of flutes.

12. The fastener of claim 1, wherein the annular flange comprises a dome shaped upper surface and a flat lower surface.

13. A fastener comprising:
an elongated shank having a longitudinal axis;
a head portion formed at a first end of the shank, the head comprising an annular flange extending radially from the longitudinal axis;
a first section extending along at least a portion of the shank and disposed adjacent to the head portion;
a second section extending along at least a portion of the shank and disposed adjacent to the first section, the second section having a diameter less than a diameter of the first section;
a knurled section extending along at least a portion of the shank and disposed adjacent to the second section, the knurled section comprising a plurality of grooves extending parallel to the longitudinal axis and circumferentially surrounding the portion of the shank;
a helical thread portion extending axially along at least a portion of said shank toward a second end of the shank; and
a transition section disposed between the knurled section and the helical thread portion, the transition section having an inward taper toward the helical thread portion.

14. The fastener of claim 13, wherein the head portion comprises a polygonally shaped outer surface positioned above the annular flange.

15. The fastener of claim 13, wherein the knurled section has a length of about 0.5 inches.

16. The fastener of claim 13, wherein the knurled section comprises greater than 40 grooves.

17. The fastener of claim 15, wherein the first cylindrical section has a diameter of about 1.25 inches.

18. The fastener of claim 17, wherein the second cylindrical section has a diameter of about 0.937 inches.

19. The fastener of claim 16, wherein the grooves are substantially parallel to the longitudinal axis.

* * * * *